May 23, 1933.  A. D. ROSE  1,910,060
COMBINED TRAP AND PRESSURE EQUALIZING DEVICE
Filed Oct. 1, 1930  2 Sheets-Sheet 1
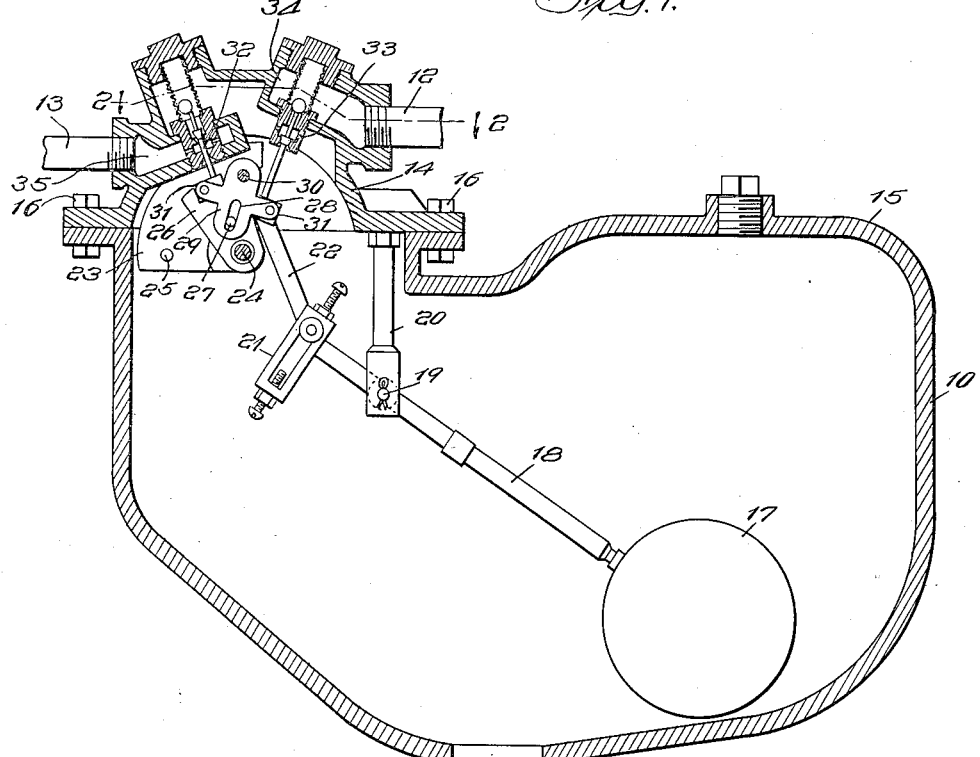
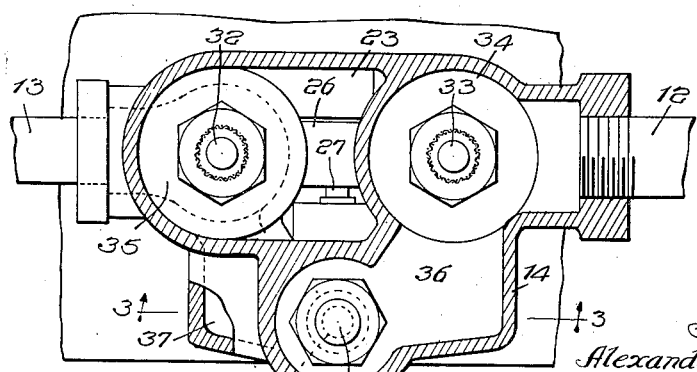
Inventor:
Alexander D. Rose

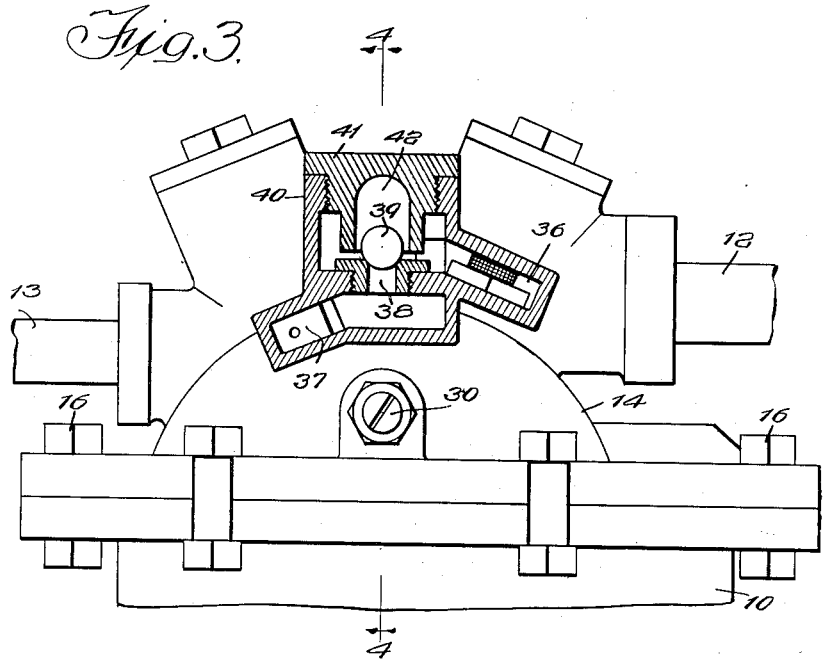
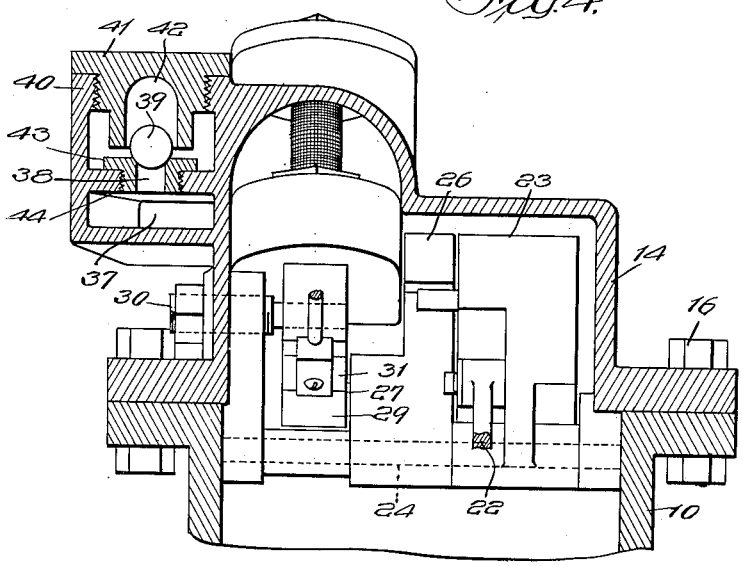

Patented May 23, 1933

1,910,060

UNITED STATES PATENT OFFICE

ALEXANDER D. ROSE, OF CHICAGO, ILLINOIS, ASSIGNOR, BY MESNE ASSIGNMENTS, TO JAS. P. MARSH CORPORATION, OF CHICAGO, ILLINOIS, A CORPORATION OF ILLINOIS

COMBINED TRAP AND PRESSURE EQUALIZING DEVICE

Application filed October 1, 1930. Serial No. 485,706.

The invention relates to a device having means for equalizing the pressure in the supply and return of a heating system when the pressure in the supply is less than in the return and which also provides means for receiving a prescribed accumulation of condensate from the system for return to the boiler, the device having means whereby pressure in the supply side of the system is applied to the condensate when the volume thereof reaches the prescribed amount.

The invention has also as an object the provision of a construction which will materially reduce the piping and fittings now required in order to install a device capable of accomplishing the above and other objects.

It is an object of the invention to combine means for equalizing the pressures above referred to with an element of a boiler return trap, said means including a connection or passage extending between and connecting openings provided in the casing of the trap, through which openings the trap is connected with the supply and return of the heating system.

It is an object to provide said connection or passage with pressure operable means for connecting the supply and return with each other when said pressure in the supply is lowered below that existing in the return, to accomplish equalization of pressure in the supply and return.

It is a further object of the invention to provide a trap having a valve controlled passage for connecting the trap with the supply side of the system and to provide a connecting passage which extends from said first mentioned passage to another passage, the latter of which connects the return side of the system with said trap and to arrange a valve in said connecting passage which valve is automatically operable to effect a communication between said supply and return when a pressure occurs in the supply which is lower than that in the return.

The invention has these and other objects, all of which will be explained in detail and more readily understood when read in conjunction with the accompanying drawings which illustrate a trap having the improvement applied thereto. It is manifest that changes and modifications may be resorted to without departing from the spirit of the appended claims forming a part hereof.

In the drawings, Fig. 1 is a central section of a trap having the invention associated therewith;

Fig. 2 is a section taken on the line 2—2 of Fig. 1;

Fig. 3 is a section taken on the line 3—3 of Fig. 2; and

Fig. 4 is a section taken on the line 4—4 of Fig. 3.

The embodiment of the invention illustrated in the drawings is shown as applied to a boiler return trap which includes a casing 10, a condensate inlet passage 11, an opening 12 which is adapted for connection with the supply side of a heating system and an opening 13, the latter of which is provided for connection with the return side of the system. The trap also includes a head 14 which is secured to the body 15 through the medium of bolts such as 16. A float 17 is arranged within the body of the trap and is mounted upon an arm 18 which is pivoted at 19 to the support 20. The end 21 of the arm 18 has one end of a link 22 connected thereto, the opposite end of the link being connected with a swinging element 23 which is pivoted at 24 and has pins such as 25 projecting from one face thereof which are adapted to engage the opposite edges of another pivoted element 26. This pivoted element 26 has a pin 27 projecting from one face thereof which operates in a slot 28 provided in the pivoted element 29, the latter of which is pivoted at 30. The pivot element 29 has the laterally projecting arms 31—31 which are respectively connected with valves respectively and generally designated 32 and 33, the latter of which control the flow of pressure from the return 13 to the casing 15 and from the supply 12 to the casing for the purpose and in the manner described in the application filed by me on May 5, 1930— Serial No. 449,772. This mechanism just referred to and the particular construction of the valves 32 and 33 form no part of the present invention and therefore will not be further described herein. Suffice to say that the head 14 is provided with valve chambers designated 34 and 35 between which a passage 36 extends to provide means of communication between the valve chambers of the valves 32 and 33, the latter of which controls the flow of pressure from the supply side of the system to the interior of the casing of the trap and the former valve providing means for controlling the occurrence of a reduced pressure in the interior of the trap.

By referring paticularly to Figs. 2, 3 and 4, it will be noted that one branch of the passage 36 is arranged to communicate with the valve chamber 34, the latter of which communicates with the supply pipe or connection 12 and that the branch 37 of the passage 36 completes a connection between the passage 36 and the chamber 35 of the valve 32. In other words, a direct passage is afforded between the valve chambers 34 and 35. A check valve generally designated 38 is located in the passage 36.

By referring to Fig. 3, it will be noted that the check valve generally designated 38 is arranged in the passage and that the valve 38 is constructed so that any pressure below atmospheric pressure in the return side of the system will not affect or unseat the ball 39 of said valve. It is also evident that the construction of said valve is such that any pressure above atmospheric pressure existing in the supply side of the system is ineffective to actuate said valve. The structure just referred to including the check valve and the passages 36 and 37 provides a means for completing a connection between the supply and return sides of the system when a pressure exists in the supply side of the system which is lower than that existing in the return, it being manifest that when this last mentioned condition exists, the ball check will be displaced relatively to its seat and complete a communication between the supply and return sides of the system through the passage 36 which will cause equalization of pressure in the supply and the return.

It will be noted that the structure provides a means whereby the trap may function in a manner to return the condensate to the boiler through means of the boiler or other pressure existing in the supply side of the system and that the mechanism including the ball check 39 may operate regardless of the condition of either the valves 32 and 33.

The passage 36 is provided with an upwardly projecting tubular extension 40 which is threaded and closed through the agency of the cap 41 which is provided with the recess 42, the latter of which produces a cage for the ball 39 which will maintain the latter in proper relation to the seat 43 which is removably mounted in a threaded opening 44 provided in one wall of the passage 36.

From the foregoing description, it is evident that a structure is produced which will eliminate many of the pipes or passages, fittings and connections now necessary in a heating system and that said structure provides means for equalizing the pressure in the supply and return and that a unitary device is provided which produces a means capable of returning condensate to a boiler and equalizing pressure in the supply and the return when said pressure in the supply is less than in the return.

Having thus described the invention, what I claim and desire to cover by Letters Patent is:

1. In a device of the kind described, the combination of a casing, passages communicating with said casing, valves respectively controlling said passages, means operable by liquid in said casing for alternately actuating said valves to connect said passages with said casing, said casing having a passage connecting said first mentioned passages, and an automatically operable valve operable by pressure in one of said passages providing means for controlling said connecting passage and connecting said last mentioned passage with said first-mentioned passages.

2. In a device of the kind described, the combination of a casing, passages communicating with said casing, valve means controlling communication between said passages and casing, means in said casing for actuating said valve means, said casing having a passage connecting said first mentioned passages, and a valve providing means for connecting said first mentioned passages with each other, said valve being controlled by pressure existing in one of said first mentioned passages.

3. In a device of the kind described, the combination of a casing, passages communicating with said casing, valves respectively controlling communication of said passages and casing, means in said casing for actuating said valves, said casing having a passage connecting said first mentioned passages, and an automatically operable valve providing means for connecting said first mentioned passages, said last mentioned valve being operable independently of said first mentioned valves with said first mentioned valves respectively in either an open or closed position.

4. In a device of the kind described, the combination of a casing, passages communicating with said casing, valves respectively controlling communication of said passages and casing, means in said casing for actuating said valves, said casing having a passage connecting said first mentioned passages, and an automatically operable valve in said connecting passage controlled by pressure in said first mentioned passages providing means for connecting said first mentioned passages with each other.

5. In a device of the kind described, the combination of a casing, said casing having a plurality of passages for respectively connecting said casing with the supply and return of a heating system, both of said passages being adapted for communication with the interior of said casing, a valve controlling each passage, and means for actuating said valves to complete and prevent communication between said passages and said casing, said casing having a passage connecting said first mentioned passages with each other, a pressure operable valve in said passage operable by pressure in said first mentioned passages, said valve providing means for completing a communication between said first mentioned passages with said first mentioned valves in either of their positions.

6. In a boiler return trap, the combination of a casing having passages for respectively connecting said casing with the supply and return of a heating system, a valve in that passage which is adapted to be connected with the supply, said valve controlling communication between said supply and casing, said casing having a passage connecting said passages which are adapted to be connected with said supply and return of said heating system and a valve in said last mentioned passage, said valve being operable by a pressure in said supply below atmospheric pressure and providing means for completing communication between said casing and either that passage which is adapted for connection with the supply of said heating system or that passage which is adapted for connection with said return.

7. In a device of the kind described, the combination of a casing, said casing having passages for respectively connecting said casing with the supply and return of a heating system, said passage for connection with said supply including a portion which communicates with said casing, and a valved portion which is adapted for communication with the return, a valve controlling each passage, said valve in that portion of said passage which communicates with the return being operable by pressure in the return above the pressure in the supply and providing means for completing a connection between said first mentioned passages of said casing.

In witness whereof, I hereunto subscribe my name this 19th day of September, A. D. 1930.

ALEXANDER D. ROSE.